United States Patent [19]
Ito et al.

[11] Patent Number: 5,966,114
[45] Date of Patent: Oct. 12, 1999

[54] DATA PROCESSOR HAVING GRAPHICAL USER INTERFACE AND RECORDING MEDIUM THEREFOR

[75] Inventors: Masanori Ito, Yokkaichi; Akiko Inami, Hashima-gun; Toshiyuki Takada, Ogaki, all of Japan

[73] Assignee: Sanyo Electric Co., Ltd., Osaka, Japan

[21] Appl. No.: 08/802,980

[22] Filed: Feb. 20, 1997

[30] Foreign Application Priority Data

| Feb. 20, 1996 | [JP] | Japan | 8-032122 |
| Nov. 29, 1996 | [JP] | Japan | 8-320367 |
| Dec. 3, 1996 | [JP] | Japan | 8-322928 |

[51] Int. Cl.⁶ .................................................. G09G 5/00
[52] U.S. Cl. ........................... 345/113; 345/114; 345/339; 345/344
[58] Field of Search .................................. 345/113, 114, 345/339, 344, 348, 351, 341, 340, 342

[56] References Cited

U.S. PATENT DOCUMENTS

| 5,384,910 | 1/1995 | Torres | 345/352 |
| 5,448,695 | 9/1995 | Douglas et al. | 345/347 |
| 5,617,526 | 4/1997 | Oran et al. | 395/326 |
| 5,640,498 | 6/1997 | Chew | 345/433 |
| 5,757,371 | 5/1998 | Oran et al. | 345/348 |
| 5,758,331 | 5/1998 | Johnson | 705/412 |

*Primary Examiner*—Bipin H. Shalwala
*Assistant Examiner*—Ricardo Osorio
*Attorney, Agent, or Firm*—Darby & Darby

[57] ABSTRACT

A data processor in which special regions 31a, 31b are set in the backmost screen, and comprises means for specifying the functions to be started corresponding to them, and means for registering the specified special regions 31a, 31b and the function to be started corresponding to them in correspondence to a specific wallpaper 31. When coordinates data of the position selected by the cursor in the backmost screen is included in the special regions 31a, 31b, the function registered in correspondence thereto is started. In such constitution, complicated operation for starting up a required function by accurately selecting a small icon by the cursor is eliminated, and the working efficiency and controllability are enhanced.

21 Claims, 8 Drawing Sheets

ICON   CURSOR

FIG. 3

| SPECIAL REGION INFORMATION | | |
|---|---|---|
| SPECIFIC INFORMATION | COORDINATE | COMPUTER PROGRAM NAME |
| A | (X1,Y1)<br>(X1',Y1') | PASSWORD |
|  | (X2,Y2)<br>(X2',Y2') | MAIL |
| B | (X1,Y1)<br>(X1',Y1') | PASSWORD |
|  | (X2,Y2)<br>(X2',Y2') | DIARY |
| . | ... | ... |

| SPECIAL REGION WALLPAPER INFORMATION |
|---|
| WALLPAPER SPECIFIC INFORMATION — SPECIAL REGION SPECIFIC INFORMATION |
| 31–A |
| 32–B |
| . |

DATA PROCESSOR HAVING GRAPHICAL USER INTERFACE AND RECORDING MEDIUM THEREFOR

BACKGROUND OF THE INVENTION

The present invention relates to a data processor having a GUI (graphical user interface) capable of starting up various functions such as data editing, by selecting an icon by moving a cursor as a pointer on a display screen, for example, a word processor or a personal computer. More particularly, the present invention relates to a recording medium in which a computer program for starting various functions is recorded in such data processor.

Data processors having a GUI are popular owing to the enhanced visibility and controllability of display content on the screen by using not only characters but also graphics. In such data processors having a GUI, icons symbolizing filenames and commands by intuitive graphics are widely used.

FIG. 1 is a schematic diagram showing a screen display example of a conventional data processor using such icons. In such conventional data processor, the user operates a pointing device such as a mouse to move the cursor to a position overlapping with a specific icon on the display screen, and clicks a mouse button, then the icon is selected, and the function symbolized by the icon is started up.

On the GUI display screen, the screen on which a wallpaper is pasted is positioned in the lowest layer of the screen, and one or plural window screens are positioned in the upper layers. On the window screens, the display stratum is determined depending on which screen the input focus is adjusted. Specifically, the window screen on which the input focus is adjusted at this point is displayed in the uppermost layer, and other window screens are sequentially moved to the lower layers.

In other data processors becoming popular, for example, an icon of launcher software is clicked to start up the launcher software and display the window screen thereof, and various application programs can be started up from the window screen of this launcher software.

Icons are, however, generally small graphics, and when the number of icons is increased as the functions are increased, icons are displayed closely to each other. To select an icon in such state, it is difficult to place the cursor accurately on an intended icon. It is therefore hard to select the function by the icon, that is, to click or double-click the mouse button, and it is highly possible to click a wrong icon beside a desired icon by mistake, and it causes problems in working efficiency and controllability.

In such a case, the individual icons may be displayed in a reduced size, but the reduction of display size of icons is limited from by visibility.

Or, in a data processor for starting up a computer program from the window screen of launcher software, as mentioned above, when a window screen of the launcher software is selected by the cursor, the input focus is adjusted to that window screen, and the window screen of the launcher software is displayed on the uppermost layer of the display screen. Therefore, the window screen hitherto displayed on the uppermost layer is concealed by the window screen of the launcher software, and the user does not know which screen is displayed beneath the window screen of the launcher software.

SUMMARY OF THE INVENTION

The present invention is intended to solve the above problems, and it is hence an object thereof to present a data processor capable of starting up a computer program from a screen positioned on the lowest layer on which the wallpaper is pasted, and preventing the screen of the lowest layer from surfacing up to the uppermost layer by selection of the icon at this time, so that the screen for staring up a function may not disturb other displays, and a recording medium in which a computer program used therein is recorded.

It is an another object to present a data processor capable of setting a region wider than a display area of an icon as a special region in order to start up a computer program on a screen positioned in the lowest layer on which the wallpaper is pasted, and starting up various functions only by selecting this special region by the cursor, and a recording medium in which a computer program used therein is recorded.

A data processor according to a first aspect of the invention comprises: means for registering a region set in a screen on which a wallpaper is pasted, and a function to be started in correspondence to the region; and means for starting the function registered in correspondence to the region when coordinates data of the position selected by a pointer on the screen on which the wallpaper is pasted is included in the region.

A recording medium according to a second aspect of the invention including a program readable by a computer comprises the steps of: registering a region set in a screen on which a wallpaper is pasted, and a function to be started in correspondence to the region; and starting the function registered in correspondence to the region when coordinate data of the position selected by a pointer on the screen on which the wallpaper is pasted is included in the region.

A data processor according to a third aspect of the invention comprises: means for setting a region of an arbitrary size in a screen on which a wallpaper is pasted; pointing means for selecting a position on the screen; means for registering a Function to be started in correspondence to the region; and means for starting the function registered in correspondence to the region when the coordinate data of the position selected by the pointing means on the screen on which the wallpaper are pasted is included in the region.

A recording medium according to a fourth aspect of the invention including a method performed by a computer which comprises the steps of: setting a region of an arbitrary size in a screen on which a wallpaper is pasted; registering a function to be started in correspondence to the region; and starting the function registered in correspondence to the region when the coordinate data of the position selected by a pointer on the screen on which the wallpaper is pasted are included in the region.

A data processor according to a fifth aspect of the invention displays a backmost screen on which a wallpaper is pasted, and icons and window screens displayed in the backmost screen, in which the backmost screen is always positioned behind the icons and window screens, while one of the window screens is changed in the display position to the uppermost position by selecting by a pointer, and comprises: means for setting a region of an arbitrary size in the backmost screen and specifying a function to be started in correspondence to the region; and means for starting the function registered in correspondence to the region preliminarily when the coordinate data of the position selected by the pointer in the backmost screen are included in the region.

A data processor according to a sixth aspect of the invention, in addition to the sixth aspect, further comprises: means for registering the backmost screen to which the region specifying the function to be started is set in correspondence to a specific wallpaper.

A data processor according to a seventh aspect of the invention, in addition to the sixth aspect, further comprises: means for starting a function corresponding to the type of an icon when the position selected by the pointer in the display screen is included in the region and is overlapped with the display position of the icon.

A recording medium according to a eighth aspect of the invention includes a program readable by a computer, for displaying a backmost screen on which a wallpaper is pasted, and icons and window screens displayed in the backmost screen, in which the backmost screen is always positioned behind the icons and window screens, while one of the window screens is changed in the display position to the uppermost position by selecting by a pointer, comprises the steps of: setting a region of an arbitrary size in the backmost screen and specifying a function to be started in correspondence to the region; and starting the function registered in correspondence to the region preliminarily when the coordinate data of the position selected by a pointer in the backmost screen are included in the region.

In a recording medium according to a ninth aspect of the invention, in addition to the eighth aspect, the program further comprises a step of registering the backmost region in which the region specifying the function to be started is set in correspondence to a specific wallpaper.

In a recording medium according to a tenth aspect of the invention, in addition to the eighth aspect, the program further comprises a step of starting a function corresponding to the type of icon when the position selected by the pointer in the display screen is included in the region and is overlapped with the display position of the icon.

A data processor according to an eleventh aspect of the invention displays a backmost screen on which a wallpaper is pasted, and icons and window screens displayed in the backmost screen, in which the backmost screen is always positioned behind the icons and window screens, while one of the window screen is changed in the display position to the uppermost position by selecting by a pointer, and comprises: means for setting a region of an arbitrary size on a wallpaper to be pasted on the backmost screen and specifying a function to be started in correspondence to the region; means for registering correspondence between the region specified by the means and the function to be started; and means for starting the function registered in correspondence to the region when the coordinate data of the position selected by the pointer in the backmost screen are included in the region.

A data processor according to a twelfth aspect of the invention, in addition to the eleventh aspect, further comprises: means for starting a function corresponding to the type of icon when the position selected by the pointer in the display screen is included in the region and is overlapped with the display position of the icon.

A recording medium according to a thirteenth aspect of the invention includes a program readable by a computer, for displaying a backmost screen on which a wallpaper is pasted, and icons and window screens displayed in the backmost screen, in which the backmost screen is always positioned behind the icons and window screens, while one of the window screen is changed in the display position to the uppermost position by selecting by a pointer, comprises the steps of: setting a region of an arbitrary size in a wallpaper to be based on the backmost screen and specifying a function to be started in correspondence to the region; registering correspondence between the region specified by the step and the function to be started; and starting the function registered in correspondence to the region when the coordinate data of the position selected by a pointer in the backmost screen are included in the region.

In a recording medium according to a fourteenth aspect of the invention, the program further comprises a step of starting a function corresponding to the type of icon when the position selected by the pointer in the display screen is included in the region and is overlapped with the display position of the icon.

In the data processors of the first, third and fifth aspects of the invention, and the recording media in the second, fourth, and eighth aspects, a region of an arbitrary size (a special region) is set in a screen on which the wallpaper is pasted, and a function to be started when this region (special region) is selected is registered in correspondence. In the screen on which the wallpaper is pasted, when the coordinate data at the position selected by the pointer is included in this region (special region), the function registered in correspondence to this region (special region) is started up.

It is therefore possible to start up a computer program from the screen on which the wallpaper is pasted, and even if the screen on which the wallpaper is pasted is selected, the screen on which the wallpaper is pasted is not surfaced up to the uppermost layer. Therefore, the screen on which the wallpaper is pasted does not conceal the hitherto displayed screen, and does not disturb the display. It is also possible to set freely a region (a special region) in the screen on which the wallpaper is pasted, so that a region wider than an icon of which display size is preliminarily determined can be set as a starting region (a special region) of a computer program. Accordingly, the selection of the icon, that is, the operation for selecting the function is facilitated, and the working efficiency is enhanced and the controllability is improved.

In the data processor of the eleventh aspect of the invention and the recording medium in the thirteenth aspect, a region of an arbitrary size (a special region) is set in the wallpaper pasted to the backmost screen, and a function to be started by selecting this region (special region) is registered in correspondence. ()n the backmost screen, when the coordinate data at the position selected by the pointer is included in this region (special region), the function registered in correspondence to this region (special region) is started up.

It is therefore possible to start up a computer program from the wallpaper, and when the wallpaper is selected, the wallpaper screen is not surfaced up to the uppermost layer. Therefore, the screen on which the wallpaper is pasted does not conceal the hitherto displayed screen, and does not disturb the display. It is also possible to set freely a region (a special region) in the wallpaper, so that a region wider than an icon of which display size is preliminarily determined can be set as a starting region (a special region) of a computer program. Accordingly, the selection of the icon, that is, the selecting operation of the function is facilitated, and the working efficiency is enhanced and the controllability is improved.

In the data processor of the sixth aspect of the invention and the recording medium of the sixth aspect, the backmost screen in which the region designating the function to be started is set is registered in correspondence to a specific wallpaper. Therefore, when the backmost screen is selected, the wallpaper corresponding to the backmost screen is called and displayed.

In the data processors of the seventh and twelfth aspects of the invention and the recording media of the tenth and fourteenth aspects, when the position selected by the pointer is included in a region (a special region) and also overlaps with the display position of the icon, the function corresponding to the kind of the icon is started by priority.

Therefore, when the icon is displayed in the background screen or in the screen or in the region (special region) set in the wallpaper, if the pointer overlaps with the icon, the computer program corresponding to the icon is started, so that the function of the icon is not disturbed by the region (special region).

By employing such constitution, a data processor easy in operation for selecting function, high in working efficiency, and excellent in controllability is realized.

The above and further objects and features of the invention will more fully be apparent from the following detailed description with the accompanying drawings.

BRIEF DESCRIPTION OF THE SEVERAL VIEWS OF THE DRAWINGS

FIG. 3 is a schematic diagram showing an example of registration content of special region registration portion of the data processor of the invention;

DESCRIPTION OF THE PREFERRED EMBODIMENTS

Figure 1:
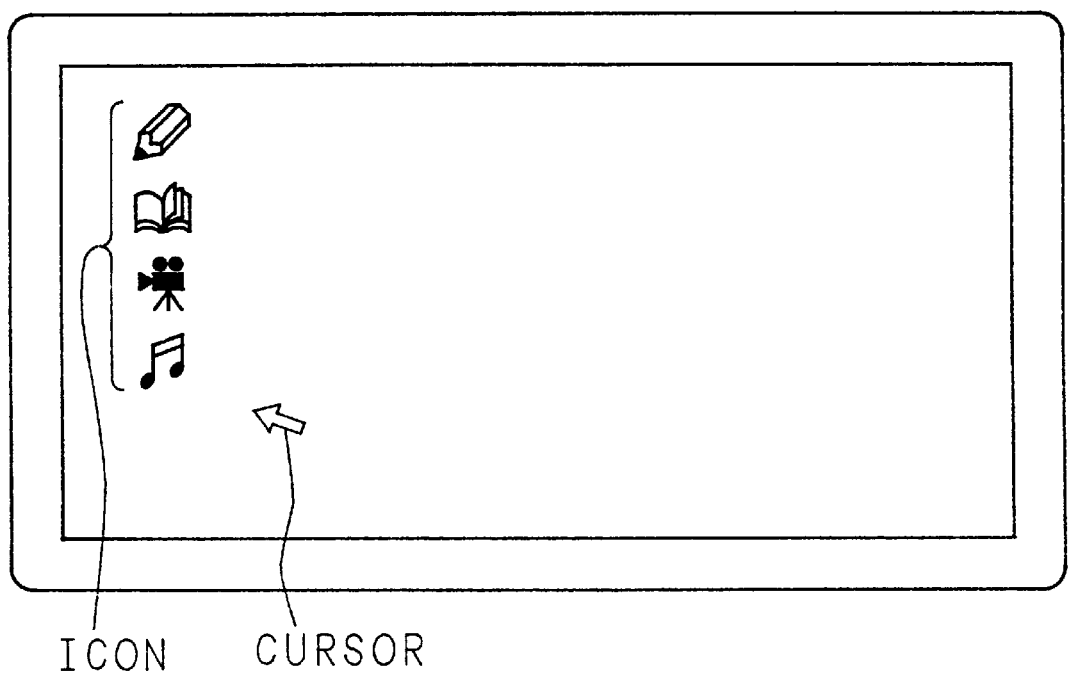
FIG. 1 is a schematic diagram showing a screen display example of a conventional data processor.
Figure 2:
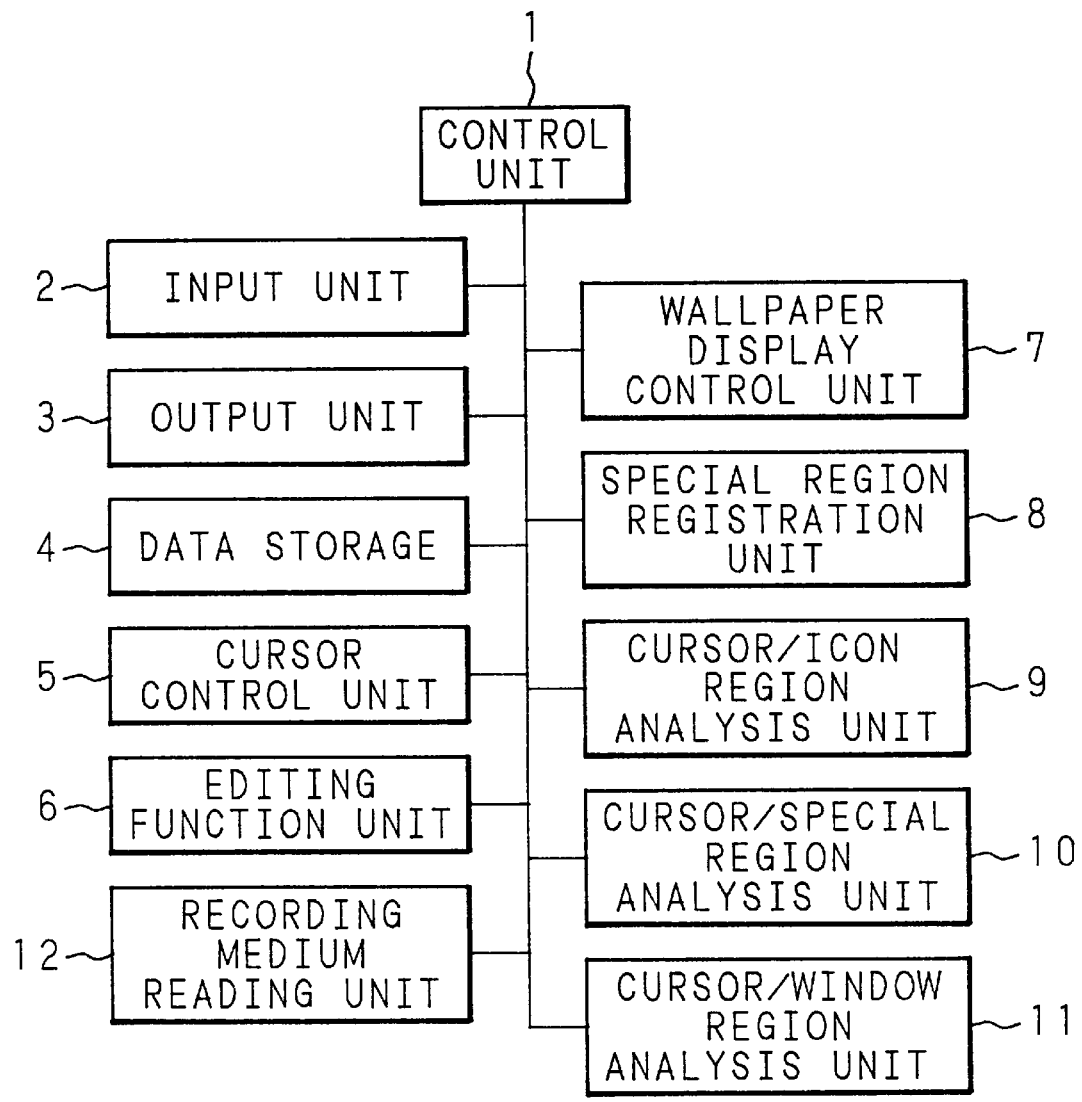
FIG. 2 is a block diagram of a data processor of the invention.

FIG. 2 is a block diagram showing a structural example of a data processor according to the invention. In FIG. 2, reference numeral 1 denotes a control unit composed of a CPU, which controls operation of the components described below. Reference numeral 2 denotes an input unit comprising a keyboard, a mouse and others. This input unit 2 enables to start various functions by selecting (clicking or double-clicking the mouse button) an icon displayed in the wallpaper display screen, that is, the screen of the lowest layer where the wallpaper is pasted (hereinafter called the backmost screen) or the region (hereinafter called special region) registered in the wallpaper display screen. It also enables to enter various commands such as a command for replacing the wallpaper displayed at this moment to other wallpaper and displaying, a command for setting the special region in the wallpaper display screen and registering the function to be started in the special region, a call command of registered special region, and a start command of other functions, to move the cursor displayed on the display screen of an output unit 3 described below, to select the icon or above special region by the cursor, or to specify the special region to be registered.

Herein, the wallpaper is an image pasted to the backmost screen (the screen where the wallpaper is pasted and the icon or window screen is displayed, being the screen serving as the base of display), and the icons or window screens are displayed on the wallpaper.

As for the difference between the window screen, icon and the wallpaper, the window screen appears in the uppermost screen (the screen displayed at the uppermost position) when the screen is selected, while the wallpaper pasted on the backmost screen does not appear before the icon or window screen when it is selected. Still more, the window screen or icon can be freely changed in the display position on the wallpaper by the so-called drag operation by selecting and pulling the window screen or icon by the cursor, while the wallpaper cannot be changed in the pasting position on the backmost screen by drag operation.

In this embodiment, the backmost screen on which the wallpaper is pasted is called the wallpaper display screen.

The output unit 3 comprises a hit map display composed of CRT display, liquid crystal display and the like, and the cursor, icons, window screens and others are displayed on the wallpaper display screen. In a data storage unit 4 composed of hard disk, semiconductor memory (ROM, RAM and others), a computer program for starting a function for hooting up a computer program from a specific region of the wallpaper display screen (it is called wallpaper launcher in this embodiment), a computer program for starting other functions, wallpaper to be pasted on the backmost screen, and others are store. Also, the data storage unit 4 stores image information displayed on the backmost screen, that is, what wallpaper is pasted, what icon is displayed in which position, what window screen is displayed in which position, which screen is selected and displayed on the uppermost screen, and other display control information.

A cursor control unit 5 controls the move of the cursor on the wallpaper display screen, calculates the coordinate data of the cursor position, and gives to a cursor/window region analysis unit 11, a cursor/icon region analysis unit 9, and a cursor/special region analysis unit 10.

The cursor/window region analysis unit 11 judges whether the cursor and window screen are overlapped or not on the wallpaper display screen, from the cursor position and the display coordinate data of the window screen stored in the data storage 4, and gives the result of analysis to the cursor control unit 5. The cursor/icon region analysis unit 9 judges whether the cursor and icon are overlapped or not on the wallpaper display screen, from the cursor position and the icon coordinate data stored in the data storage 4, and gives the result of analysis to the cursor control unit 5. The cursor/special region analysis unit 10 judges whether the cursor is overlapped with the special region or not on the wallpaper display screen, from the cursor position and the coordinate data of the special region registered in a special region registration unit 8, and gives the result of analysis to the cursor control unit 5.

In the special region registration unit 8, a special region information consisting of the corresponding relation of the position information (coordinate information) or the special region on the wallpaper display screen and the computer program started from the special region, and a special region wallpaper information for corresponding the special region information and the specific wallpaper are registered.

FIG. 3 is a schematic diagram showing the registered content in the special region registration unit 8, in which coordinate values (((X1, Y1), (X1', Y1')). . . ) of diagonal positions of the special region and the information (program name, password, etc.) for specifying the computer program to be started from the special region are stored together with the specific information (A, B, ... ) for specifying this set of special region information. Moreover, as the special region wallpaper information, the information (31, 32, ... ) for specifying the wallpaper and the specific information (A, B, ... ) for specifying the special region information are registered in correspondence to each other.

By thus registering the special region information and special region wallpaper information in the special region registration unit 8, when the wallpaper launcher function is started in cooperation with the instruction of pasting of the wallpaper corresponding to the specific region information to the backmost screen, or the wallpaper launcher function is started from the icon or the like, the wallpaper launcher function calls the wallpaper and the special region information corresponding to the wallpaper, and sets on the backmost screen, so that it is possible to start up the computer program from the specific region of the wallpaper display screen.

The cursor control unit 5 refers to the data storage 4 or special region registration unit 8, judges the kind of the function to be stated by selection of icon or special region by the cursor, and gives an instruction to an editing function unit 6. The editing function unit 6 starts up a function such as the editing function instructed from the cursor control unit 5.

At this time, the cursor control unit 5 judges the kind of the function to be started by the icon or special region selected by the cursor on the wallpaper display screen of the output unit 3, from the relation of the display position of each icon registered preliminarily in the data storage 4 or special region registration unit 8 corresponding to each function to be started by the icon or special region or the coordinate data of each special region and the coordinate data of the cursor.

A wallpaper display control unit 7 controls the display of the "wallpaper". By selecting a wallpaper to be pasted to the backmost screen from the wallpaper list stored in the data storage 4, the wallpaper display control unit 7 calls the selected "wallpaper" from the data storage 4, and pastes it to the backmost screen. For example, in the state wherein a wallpaper 31 (see FIG. 4) is pasted, by selecting a wallpaper 32, the wallpaper 31 in FIG. 4 is replaced by the wallpaper 32 in FIG. 7.

Reference numeral 12 denotes a recording medium reading unit, which is, for example, a recording medium using a compact disc (CD), composed of a so-called CD-ROM drive for reading information from a CD-ROM, and others.

Figure 4:
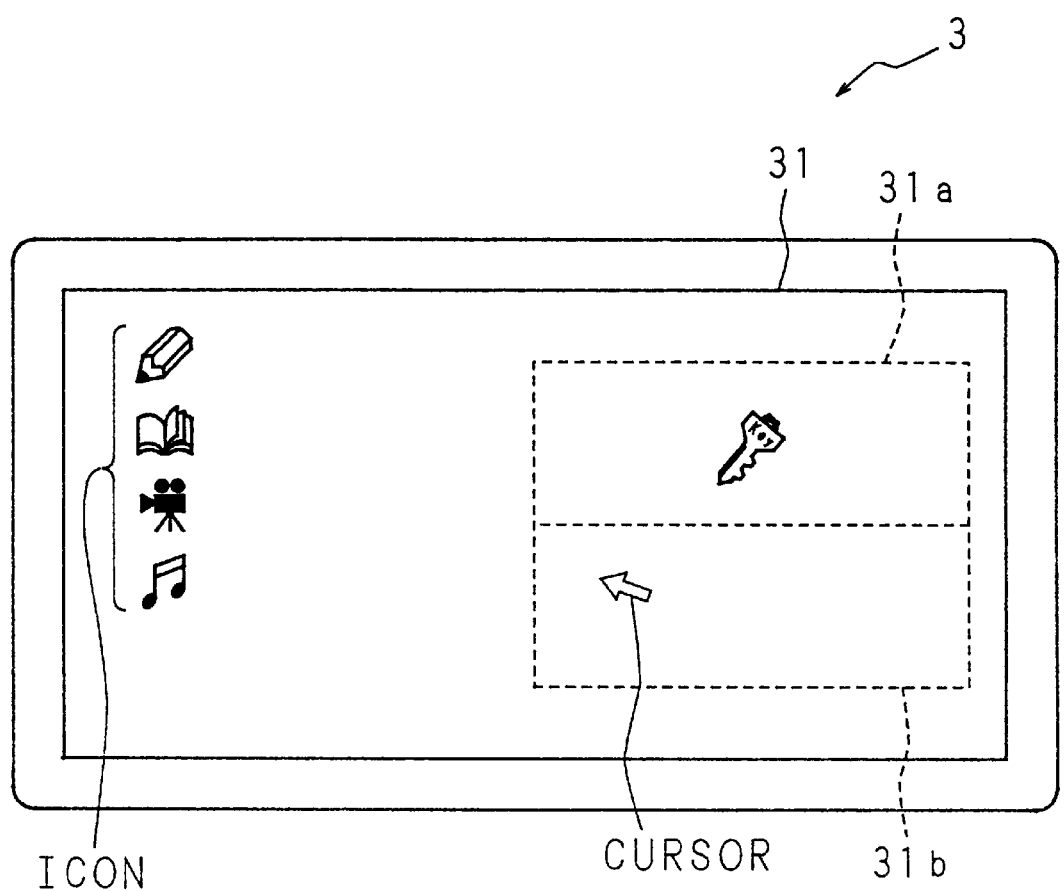
FIG. 4 is a schematic diagram showing a screen display example of the data processor of the invention.
Figure 5:
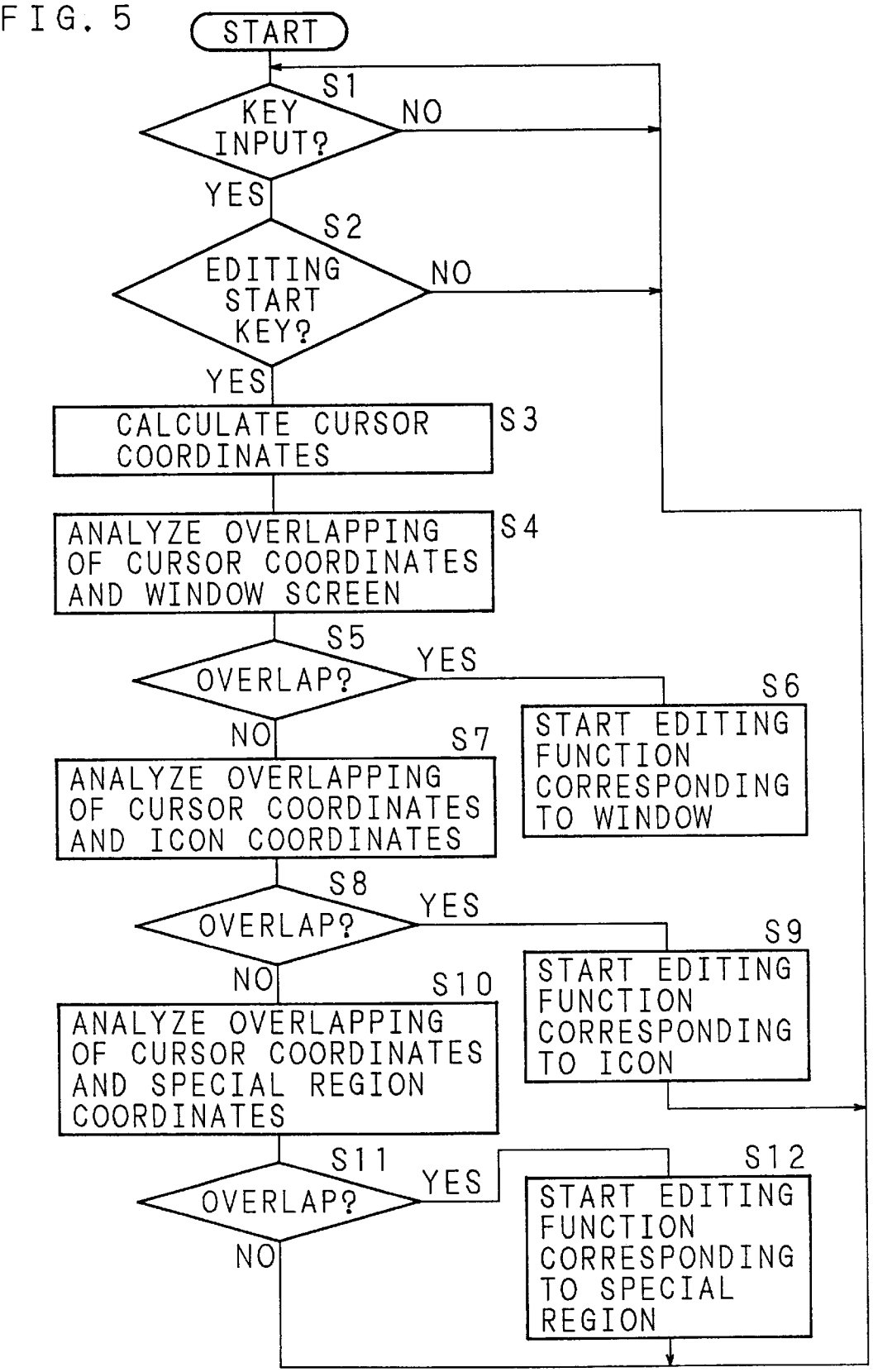
FIG. 5 is a flowchart for explaining the starting procedure of editing function by the data processor of the invention.
Figure 6:
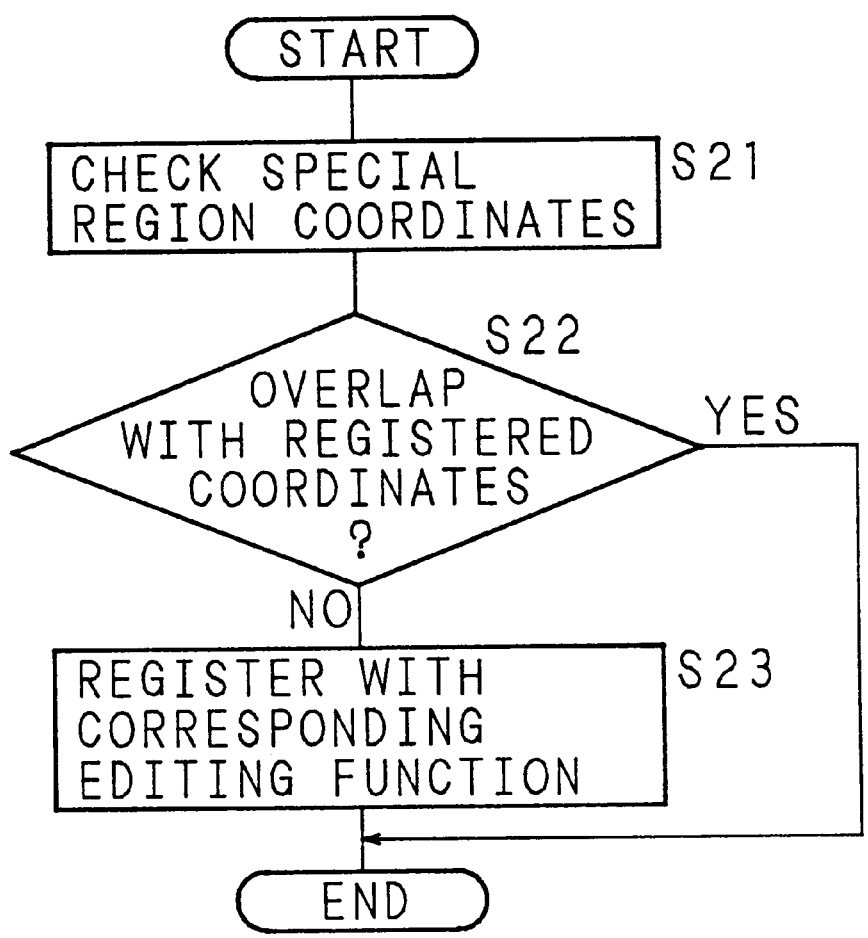
FIG. 6 is a flowchart for explaining the procedure of function registration in the data processor of the invention.

The starting procedure of editing function by the data processor of the invention having such constitution is described by referring to the flowchart in FIG. 5 and the screen display example in FIG. 4.

In FIG. 4, reference numeral 31 is a wallpaper pasted to the wallpaper display screen (backmost screen), and a figure of a key displayed within a dashes line frame indicated by a reference numeral 31a is drawn on the wallpaper, but the other region is a blank image information. Plural icons are displayed on the wallpaper 31.

To start up the editing function from the wallpaper, the user first starts the wallpaper launcher function, and registers a special region for starting the function by cursor selection in the special region registration unit 8. That is, as shown in FIG. 4, the user specifies the special region 31a or 31b of the wallpaper 31 by the cursor, designates the function to be started by selecting the special region 31a or 31b by selecting from a list of functions provided in the data processor, and registers this special region information in the special region registration unit 8. At this time, the wallpaper displayed herein and the special region information are related to correspond to each other, and are registered as the special region wallpaper information in the special region registration unit 8.

In this case, as shown in FIG. 4 either a region (special region 31a) including a graphic may be specified in the wallpaper 31, or a region (special region 31b) not including a graphic may be specified. When the special region 31a including a graphic is specified, as the corresponding function, either the function symbolized by the figure of the "key" (for example, password) may be specified, or a different function may be specified, and in particular when the function symbolized by this graphic is registered in the special region by correspondence, the function starting operation is easy and the working efficiency is enhanced.

Incidentally, the boundary of the special regions 31a, 31b may be indicated by dashes line or the like, or the range may not be displayed.

In this way, after the special region is registered, the control unit 1 waits while checking for presence or absence of key input (Step 1), and, when a key input is detected, checks whether it is the input of starting key of editing function or not (Step S2). When it is not the input of start key of editing function, the control unit 1 terminates the processing, and in the case of the input of start key of editing function, the cursor control unit 5 calculates the cursor coordinates (Step S3), and gives the calculated result to the cursor/window region analysis unit 11, cursor/icon region analysis unit 9, and cursor/special region analysis unit 10.

The cursor/window region analysis unit 11 analyzes overlapping of the cursor coordinates and icon coordinates (Step S4), and judges whether the cursor is overlapping the window screen or not (Step S5). When the cursor is overlapping the window screen, overlapping of the cursor coordinates and special region coordinates is not analyzed, and the cursor control unit 5 and editing function unit 6 start up the editing function corresponding to the window screen (Step S6), and processing is terminated.

The cursor/icon region analysis unit 9 analyzes overlapping of the cursor coordinates and icon coordinates (Step S7), and judges whether the cursor is overlapping the icon or not (Step S8). When the cursor is overlapping the icon, overlapping of the cursor coordinates and special region coordinates is not analyzed, and the cursor control unit 5 and editing function unit 6 start up the editing function corresponding to the icon (Step S9), and processing is terminated.

On the other hand, when the cursor is not overlapping the icon, the cursor/special region analysis unit 10 analyzes overlapping of the cursor coordinates and special region coordinates (Step S10), and judges whether the cursor is overlapping the special region or not (Step S11). When the cursor is not overlapping the special region, returning to step S1, the process waits for key input, but when the cursor is overlapping the special region, the cursor control unit 5 and editing function unit 6 start up the editing function corresponding to the special region (Step S12), and thereafter processing is terminated.

A procedure of function registration in the data processor of the invention is described below while referring to the flowchart in FIG. 3 and the screen display example in FIG. 7.

The control unit 1 checks the coordinates of the special region specified by the user (Step S21). The control unit 1 further checks whether the coordinates of the specified special region overlap with the coordinates of the already registered special region or not (Step S22), and processing is terminated when the specified special region overlaps with the coordinates of the registered special region. When not overlapping with the coordinates of the registered special region, the control unit 1 registers the specified region by corresponding to the special region registration unit 8 together with the editing function specified on the wallpaper on display (Step S23).

Figure 7:
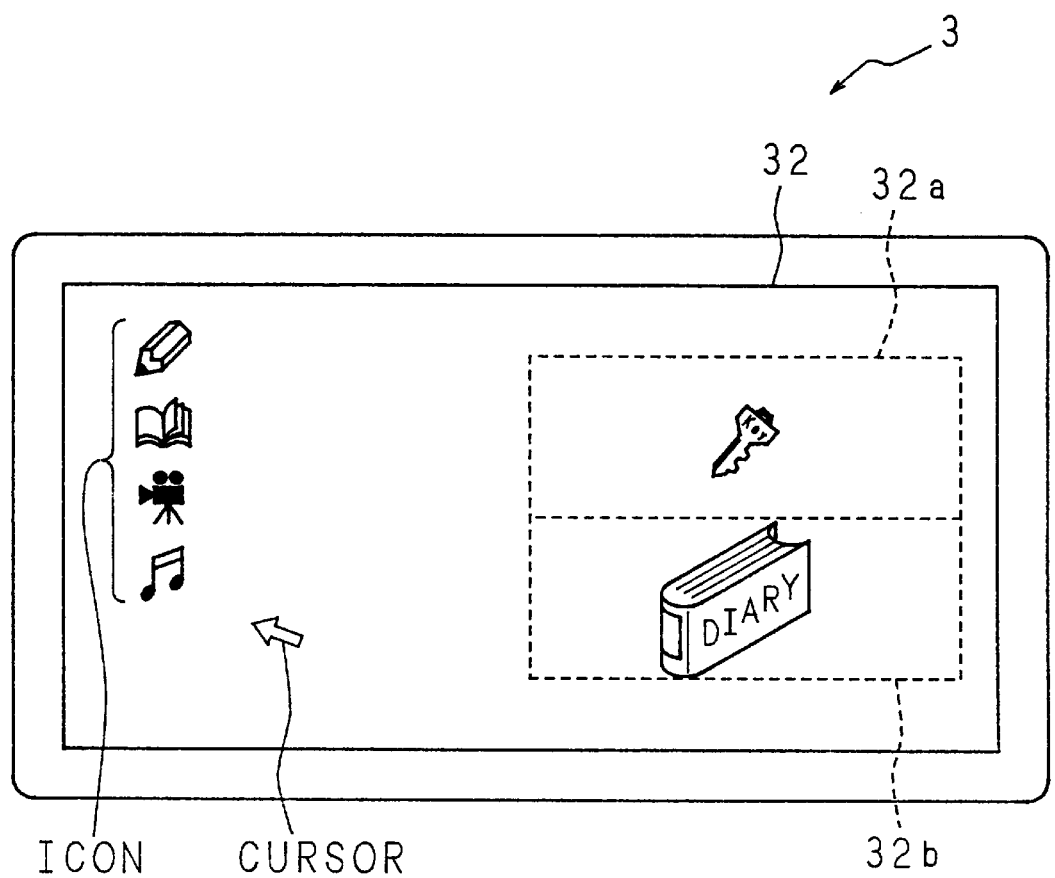
FIG. 7 is a schematic diagram showing other screen display example of the data processor of the invention.

FIG. 7 shows other wallpaper 32 in which the Figure of "key" and figure of "diary" are drawn, in which a special region 32a is provided with a setting function of a password symbolized by, for example, the figure or "key", and a special region 32b is provided with a function of a diary symbolized by the figure of "diary".

To process the display change of wallpaper, the wallpaper launcher function is started up, or the wallpaper launcher function is started depending on a specific computer program, and the function relating to the specific computer program may be changed to the wallpaper corresponding to the special region, or by using the wallpaper change function, the user may freely select and change the wallpaper.

Figure 8:
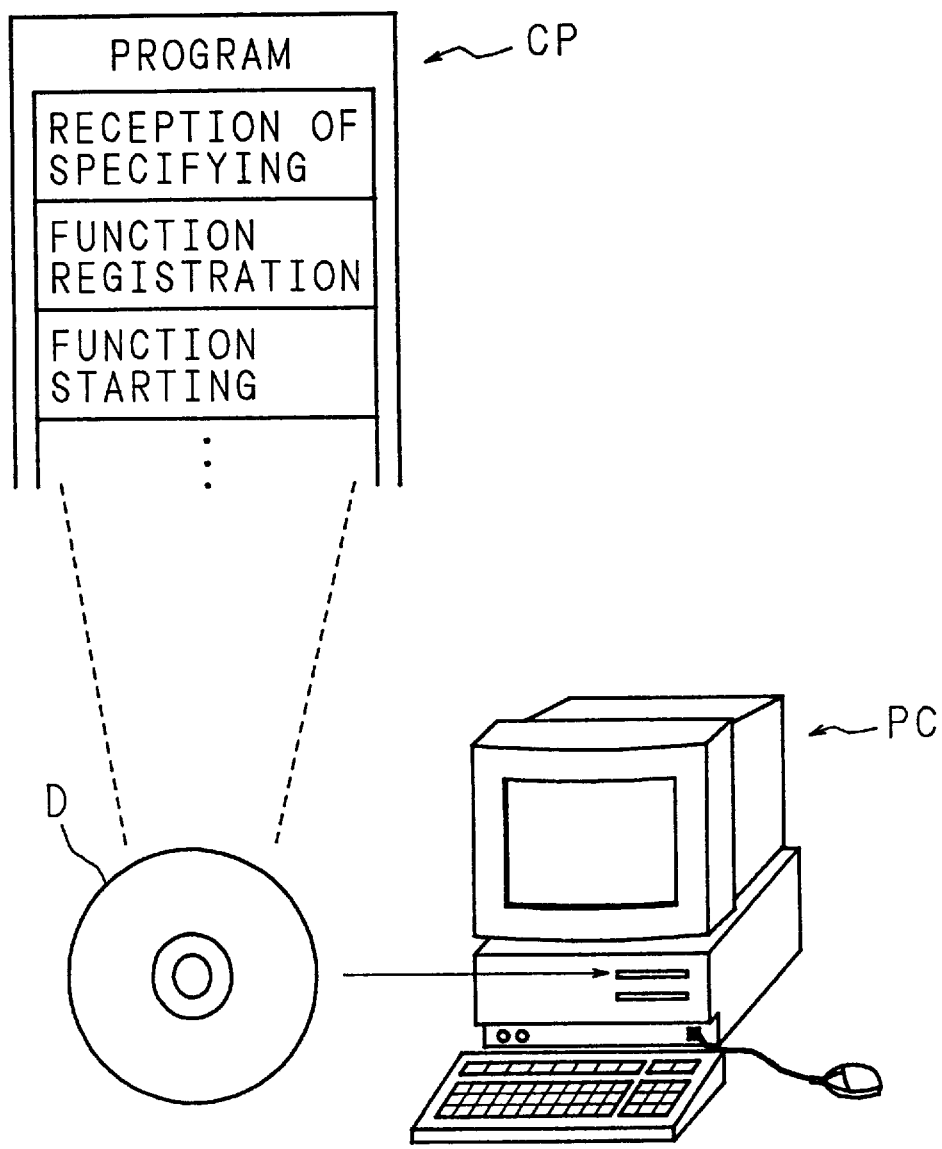
FIG. 8 is a schematic diagram conceptually showing the recording state and operating state of the recording medium of the invention.

Meanwhile, the computer program for such function starting and function registration may be preliminarily written into the ROM in the data storage 4, or as shown in a schematic diagram in FIG. 8, the computer program CP recorded in the recording medium D such as CD-ROM may be read into the hard disk or RAM of the data storage 4 from a recording medium reading unit 12 such as CD-ROM drive of a personal computer PC as the data processor of the invention.

As described specifically herein, according to the data processor of the invention, although the computer program can be started up from the screen of the lowest layer on which the wallpaper is pasted, this screen is not surfaced up to the uppermost layer, and therefore the other window screen in which the screen for starting function has been so far displayed is not concealed or disturbed.

It is also designed to set the range of the special region freely on the wallpaper, and it is possible to set a region wider than the predetermined display size of icon as a region for starting a computer program. Therefore, the operation for selection of function, that is, operation for selection of icon is easy, and the working efficiency is high, and a data processor of excellent controllability is realized.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and hounds of the claims, or equivalence of such metes and hounds thereof are therefore intended to be embraced by the claims.

We claim:
1. A data processor, comprising:
   means for registering a region set within a screen on which a wallpaper is pasted, and a function to be started in correspondence to said region; and
   means for starting the function registered in correspondence to said region when the coordinate data of the position selected by a pointer on the screen on which the wallpaper are pasted is included in said region.
2. A process performed by a computer, comprising the steps of:
   registering a region set within a screen on which a wallpaper is pasted, and a function to be started in correspondence to said region; and
   starting the function registered in correspondence to said region when the coordinate data of the position selected by a pointer on the screen on which the wallpaper are pasted is included in said region.
3. A computer program product including a computer usable storage medium having computer readable program code comprising:
   computer readable program code for causing said computer to register a region set within a screen on which a wallpaper is pasted, and a function to be started in correspondence to said region; and
   computer readable program code for causing said computer to start the function registered in correspondence to said region when the coordinate data of the position selected by a pointer on the screen on which the wallpaper is pasted are included in said region.
4. A data processor, comprising:
   means for setting a region of an arbitrary size within a screen on which a wallpaper is pasted;
   pointing means for selecting a position on the screen;
   means for registering a function to be started in correspondence to said region; and
   means for starting the function registered in correspondence to said region when the coordinate data of the position selected by said pointing means on the screen on which the wallpaper are pasted is included in said region.
5. A process performed by a computer, comprising the steps of:
   setting a region of an arbitrary size within a screen on which a wallpaper is pasted;
   registering a function to be started in correspondence to said region; and
   starting the function registered in correspondence to said region when the coordinate data of the position selected by a pointer on the screen on which the wallpaper are pasted is included in said region.
6. A computer program product including a computer usable storage medium having computer readable program code comprising:
   computer readable program code for causing said computer to set a region of an arbitrary size within a screen on which a wallpaper is pasted;
   computer readable program code for causing said computer to register a function to be started in correspondence to said region; and
   computer readable program code for causing said computer to start the function registered in correspondence to said region when the coordinate data of the position selected by a pointer on the screen on which the wallpaper is pasted are included in said region.
7. A data processor, for displaying a backmost screen on which a wallpaper is pasted, and icons and window screens displayed over said backmost screen, in which said backmost screen is always positioned behind said icons and window screen, while one of said window screen is changed within the display position to the uppermost position by selecting by a pointer, said data processor comprising:
   means for setting a region of an arbitrary size in said backmost screen and specifying a function to be started in correspondence to the region; and
   means for starting the function registered in correspondence to said region preliminarily when the coordinate data of the position selected by the pointer in the backmost screen are included in said region.

8. The data processor as set forth in claim 7, further comprising:

means for changing the wallpaper; and means for registering the backmost screen to which the region specifying the function to be started is set in correspondence to the wallpaper changed by the means for changing.

9. The data processor as set forth in claim 7, further comprising:

said means for starting being constructed to start a function corresponding to the type of icon in said region when the position selected by the pointer in said display screen is included in said region and is overlapped with the display position of the icon.

10. A method performed by a computer, for displaying a backmost screen on which a wallpaper is pasted, and icons and window screens displayed over said backmost screen, with which said backmost screen is always positioned behind said icons and window screen, while one of said window screen is changed within the display position to the uppermost position by selecting by a pointer, said method comprising the steps of:

setting a region of an arbitrary size in said backmost screen and specifying a function to be started in correspondence to the region; and starting the function registered in correspondence to said region preliminarily when the coordinate data of the position selected by a pointer in said backmost screen are included in said region.

11. The method as set forth in claim 10, in which said program further comprises the steps of:

changing the wallpaper; and registering the backmost region in which the region specifying said function to be started is set in correspondence to the changed wallpaper.

12. The method as set forth in claim 10, in which said step of starting a function starts a function corresponding to the type of icon in said region when the position selected by the pointer in said display screen is included in said region and is overlapped with the display position of said icon.

13. A computer program product including a computer usable storage medium having computer readable program code embodied therein for displaying a backmost screen on which a wallpaper is pasted, and icons and window screens displayed over said backmost screen, which said backmost screen is always positioned behind said icons and window screen, while one of said window screen is changed within the display position to the uppermost position by selecting by a pointer, said computer readable program code comprising:

computer readable program code for causing said computer to set a region of an arbitrary size in said backmost screen and to specify a function to be started in correspondence to the region; and computer readable program code for causing said computer to start the function registered in correspondence to said region preliminarily when the coordinate data of the position selected by a pointer in said backmost screen are included in said region.

14. The computer program product as set forth in claim 13, further comprising;

a computer readable program code for causing said computer to change the wallpaper; and said computer readable program code comprises computer readable program code for causing said computer to register the backmost region in which the region specifying said function to be started is set in correspondence to the changed wallpaper.

15. The computer program product as set forth in claim 13, in which said computer readable program code for causing said computer to start a function includes program code for selecting a function corresponding to the type of an icon in said region when position selected by the pointer in said display screen is included in said region and is overlapped with the display position of said icon.

16. A data processor, for displaying a backmost screen on which a wallpaper is pasted, and icons and window screens displayed over said backmost screen, in which said backmost screen is always positioned behind said icons and window screen, while one of said window screen is changed in the display position to the uppermost position by selecting by a pointer, said data processor comprising:

means for setting a region of an arbitrary size within a wallpaper to be pasted on said backmost screen and specifying a function to be started in correspondence to the region;

means for registering by correspondence between the region specified by said means and said function to be started; and means for starting the function registered in correspondence to said region when the coordinate data of the position selected by the pointer in said backmost screen are included in said region.

17. The data processor as set forth in claim 16, further comprising:

said means for starting a function being constructed to start a function corresponding to the type of icon in said region when the position selected by the pointer in said display screen is included in said region and is overlapped with the display position of the icon.

18. A method performed by a computer, for displaying a backmost screen on which a wallpaper is pasted, and icons and window screens displayed in said backmost screen, in which said backmost screen is always positioned behind said icons and window screen, while one of said window screen is changed in the display position to the uppermost position by selecting by a pointer, said method comprising the steps of:

setting a region of an arbitrary size in a wallpaper to be based on said backmost screen and specifying a function to be started in correspondence to the region;

registering by correspondence between the region specified by said step and said function to be started; and starting the function registered in correspondence to said region when the coordinate data of the position selected by a pointer in said backmost screen is included in said region.

19. The method as set forth in claim 18, in which said step of starting a function starts a function corresponding to the type of icon in said region when the position selected by the pointer in said display screen is included in said region and is overlapped with the display position of said icon.

20. A computer program product including a computer usable storage medium having computer readable program code embodied therein for displaying a backmost screen on which a wallpaper is pasted, and icons and window screens displayed in said backmost screen, in which said backmost screen is always positioned behind said icons and window screen, while one of said window screen is changed in the display position to the uppermost position by selecting by a pointer, said computer readable program code comprising:

computer readable program code for causing said computer to set a region of an arbitrary size in a wallpaper to be based on said backmost screen and to specify a function to be started in correspondence to the region;

computer readable program code for causing said computer to register by correspondence between the region specified by said step and said function to be started; and computer readable program code for causing said computer to start the function registered in correspondence to said region when the coordinate data of the position selected by a pointer in said backmost screen are included in said region.

21. The computer program product as set forth in claim 20, in which said computer readable program code for causing said computer to start a function starts a function corresponding to the type of icon in said region when the position selected by the pointer in said display screen is included in said region and is overlapped with the display position of said icon.

* * * * *